United States Patent [19]
McMillan

[11] Patent Number: 6,119,730
[45] Date of Patent: Sep. 19, 2000

[54] PRECISION LAMINAR FLOW ELEMENT FOR USE IN THERMAL MASS FLOW SENSORS AND FLOW CONTROLLERS

[75] Inventor: Robert D. McMillan, Georgetown, Tex.

[73] Assignee: McMillan Company, Georgetown, Tex.

[21] Appl. No.: 09/217,782

[22] Filed: Dec. 21, 1998

[51] Int. Cl.[7] ................................................ F15D 1/02
[52] U.S. Cl. .............................. 138/43; 138/39; 73/202
[58] Field of Search .................................. 138/39, 42, 43; 73/202, 202.5, 204, 324

[56] References Cited

U.S. PATENT DOCUMENTS

| | | | |
|---|---|---|---|
| 1,545,209 | 7/1925 | Steckel | 138/39 |
| 2,829,490 | 4/1958 | Kresse | 138/46 |
| 3,131,534 | 5/1964 | Taylor et al. | 138/46 |
| 3,204,664 | 9/1965 | Gorchev et al. | 138/46 |
| 3,626,964 | 12/1971 | Van Fossen | 138/45 |
| 3,626,984 | 12/1971 | Pratt et al. | 138/46 |
| 3,995,663 | 12/1976 | Perry | 138/39 |
| 4,196,753 | 4/1980 | Hammarstedt | 138/43 |
| 4,487,062 | 12/1984 | Olin et al. | 73/202 |
| 4,522,058 | 6/1985 | Ewing | 73/202 |
| 4,571,801 | 2/1986 | Ewing | 29/157 |
| 4,576,204 | 3/1986 | Smallhorn et al. | 138/44 |
| 4,800,754 | 1/1989 | Korpi | 73/202 |
| 5,332,005 | 7/1994 | Baan | 138/43 |
| 5,511,416 | 4/1996 | Shambayati | 73/204.21 |
| 5,576,498 | 11/1996 | Shambayati | 73/861.52 |
| 5,750,892 | 5/1998 | Huang et al. | 73/202 |
| 5,763,791 | 6/1998 | Shambayati | 73/861.52 |

OTHER PUBLICATIONS

Aalborg Instruments, "Thermal Mass Flowmeter and Controller Principle of Operation," http://www.aalborg.com/products/massflow/mf_oper.htm, © Jan. 1996 Copyright Aalborg Instruments, p. 1 of 1.

Aalborg Instruments,"AFC Mass Flow Controllers,"http://www.aalborg.com/products/massflow/afc_main.htm,© Jan. 1996 Copyright Aalborg Instruments, p. 1 of 1.

Aalborg Instruments, "GFC Mass Flow Controller Specifications," http://www.aalborg.com/products/massflow/gfc/gfc_spec.htm, © Jan. 1996 Copyright Aalborg Instruments, pp. 1–2.

Aalborg Instruments, "GFC Low Cost Mass Flow Controllers," http://www.aalborg.com/products/massflow/gfc/gfc_main.htm, © Jan. 1996 ©Aalborg Instruments, pp. 1–2.

*Primary Examiner*—James Hook
*Attorney, Agent, or Firm*—Bracewell & Patterson, L.L.P.

[57] ABSTRACT

A laminar flow element for use in thermal mass flow sensors and flow controllers is designed to provide a high degree of precision. The precision laminar flow element includes a laminar flow element having a generally pointed entry end for maintaining a pure laminar flow path around the laminar flow element. The generally pointed entry end serves to direct an incoming gas flow stream equally about an outer surface of the laminar flow element. In this way, the laminar flow path is uniform so as to maintain a desired flow accuracy. The laminar flow element provides a plurality of standoff pins protruding from the outer surface of the laminar flow element to maintain a substantially equal radial clearance around the outer surface. By maintaining a substantially equal radial clearance from one laminar flow element to another, the laminar flow element is highly interchangeable. The laminar flow element may also provide a plurality of slots formed in the laminar flow element to accept a relatively high incoming gas flow stream. The precision laminar flow element preserves a linear flow ratio for low and high flow rates. The laminar flow element may be incorporated into a thermal mass flow sensor or flow controller such that the laminar flow element is substantially concentric with a borehole of a flow block. Various laminar flow elements with different annular clearances may be inserted in the same borehole of the flow block to provide a variety of flow rate ranges.

20 Claims, 2 Drawing Sheets

PRECISION LAMINAR FLOW ELEMENT FOR USE IN THERMAL MASS FLOW SENSORS AND FLOW CONTROLLERS

BACKGROUND OF THE INVENTION

1. Field of the Invention

The present invention relates to laminar flow elements, and more particularly to a precision laminar flow element for use in thermal mass flow sensors and flow controllers.

2. Description of the Related Art

Thermal mass flow sensors and flow controllers typically incorporate a sensing tube that has two heated coils (an upstream coil and a downstream coil) wound around the sensing tube in close proximity to one another. Each heated coil is typically made of thin wire that has a characteristic of resistance change as the wire temperature changes. The heated coils direct a constant amount of heat into a gas stream flowing through the sensor tube. As the mass flow rate of the gas stream increases through the sensor tube, the sensor tube carries heat from the upstream coil to the downstream coil. The resulting temperature difference produces an increase in heat to the downstream coil and a corresponding decrease in heat to the upstream coil, thereby changing the resistances of the two coils. This resistance difference is detected via electronic circuitry and produces an output signal proportional to the mass flow rate of the gas stream.

In most commercially available mass flow sensors, the sensing tube is of a small diameter and operates in a linear flow range so long as the gas flow through the sensing tube remains sufficiently low to be in a pure laminar (not turbulent) state. Gas flow rates through most commercially available thermal mass flow sensors have only measured flow rates through the sensing tube to flows of 20 to 30 sccm or ml/min (0.02 to 0.03 liters/minute).

In order to provide thermal mass flow sensors with extended flow ranges beyond 20 to 30 sccm, a common practice has been to divide the incoming gas mass flow into two paths: a sensing element flow path and a bypass flow path. To match the ratio of gas mass flow passing through the bypass flow path with the gas mass flow passing through the sensing element flow path, thermal mass flow sensors have incorporated a laminar flow element (also termed a restriction flow element) so that a linear relationship develops between the sensing element flow path and the bypass flow path.

Laminar flow elements are designed to produce a pressure differential directly proportional to the mass flow rate of a gas stream. A laminar flow element may be a capillary tube having a small diameter, a bundle of such tubes or other tube-based configurations. In the latter type, a flow path is divided into many small passages or channels (typically round or rectangular) to insure that sufficiently developed laminar flow (or nonturbulent flow) exists. A laminar or nonturbulent flow generally refers to the motion of a gas having local velocities and pressures which do not fluctuate randomly. The relationship between the pressure drop and the mass flow rate for laminar flow also depends upon gas viscosity which can vary over large temperature extremes. Laminar flow element designs therefore have placed some temperature constraints and pressure limits on gas in order to define overall accuracy.

The viscosity of gases, however, is essentially independent of pressure between a few hundredths of an atmosphere and several atmospheres until pressures exceed 150 pounds per square inch (psi). In the range of 10 to 50 degrees Celsius, the absolute viscosity of most gases varies only several percent, decreasing as the temperature decreases. So, even though the temperature effects are quite minimal over the above stated temperature and pressure limits, a thermal mass flow sensor design has compensated for such viscosity changes since the sensing element has been a laminar flow capillary tube. As a result, no detectable flow measuring error has resulted from reasonable swings in gas temperature or pressure.

Another approach in laminar flow element design has been to embed multiple capillary tubes in a plastic housing to achieve a capillary type of laminar flow element. This is a costly type of element design. The inside diameter of capillary tubes has varied considerably from one batch to the next. This made it difficult, if not impossible, for one to fabricate seemingly identical capillary tube elements and obtain identical flow versus pressure characteristics. Accordingly, wide variations in flow versus pressure drop characteristics have been attained. This multiple capillary tube approach has been time consuming and costly.

Another type of laminar flow element utilizes plastic "gates" to form gas flow passages. A person installing this laminar flow element has needed to experimentally cut away various "gates" to allow a correct number of passages to be used to obtain the desired flow versus pressure drop characteristics. This type of experimentation has proved to be quite labor intensive and has not provided a uniform laminar flow path around an outside perimeter of the laminar flow element. Some flow measurement error inevitably resulted when the gas flow through the sensing element was compared to the gas flow through the laminar flow element. Flow distribution varied if some gates were removed only at the bottom of the laminar flow element, as compared to removal of gates at the top of the laminar flow element. This non-uniform flow distribution affected the true ratio between the laminar flow bypass shunt and the sensing tube. With flow ratio errors that varied with flow rate, a non-linear characteristic could develop, thereby reducing overall accuracy.

A high flow version of this laminar flow element has typically been supported at each end using support rings. All bypass flow traveled through the many slots in the laminar flow element. Also, some flow inevitably traveled around the outside of the laminar flow element. It has been very difficult, if at all possible, to insure that the laminar flow element was sufficiently centered so that a radial clearance around the outer surface of the laminar flow element remained equal. If the radial clearance was variable from one laminar flow element to another, then a laminar flow element would have a different flow rate versus pressure drop characteristic when compared to other laminar flow element installations. This would likely mean that an installer would spend considerable labor time trying to "tune up" each such laminar flow element installation. Further, it has been found that if the radial clearance varied so as to exceed a certain measurement, problems arose. Laminar flow characteristics were different from the sensing element characteristics, and non-linear behavior resulted. This laminar flow element design would likely be very costly to manufacture and also lack certain precision.

Another approach to designing a laminar flow element has been the laminar flow element described in Baan, U.S. Pat. No. 5,332,005. Multiple machined plates were provided with various slots and a hole to allow a gas stream to pass through in a laminar flow fashion. This design can achieve a high degree of precision but is expensive to manufacture and would be difficult to disassemble for cleaning purposes.

AALBORG Instrument Company has utilized two forms of laminar flow element in its thermal mass flow sensors. The first type has been for relatively low flow rates. This laminar flow element design has depended upon the radial clearance around a round plug that is inserted into a flow block hole in order to establish a desired flow rate versus pressure drop characteristic across the plug. The plug is screwed into an inlet fitting and is cantilevered out from the inlet fitting. In order to maintain laminar flow, it has been necessary for the radial clearance not to exceed roughly 0.045 inches and to be precisely centered with respect to the flow block hole. Manufacturing tolerances have made it commercially impractical to assure perfect radial clearance between the cantilevered plug and the flow block hole. Examination of some AALBORG thermal mass flow sensors has revealed that the radial clearance at the inlet end varies approximately +/−0.020 inches. Due to the cantilever effect, the outlet end of the plug has been found to be either in contact with the flow block hole or roughly 0.045 inches from being at true center with respect to the flow block hole. This variance in design has yielded grossly different results from one laminar flow element to another, making ease of calibration difficult and time consuming.

Since the laminar flow path has been destroyed when the plug is not in the center of the flow block hole, non-linearities have developed, making it difficult to calibrate a flow sensor within its accuracy requirements. The flow path around the plug has not been even, further destroying the ability to obtain good linear results over any large flow range. In practice, this type of laminar flow element for low flow rates has been demonstrated to yield only about a 10-to-1 range of flow within normally accepted commercial tolerances.

For higher flow rates, AALBORG has provided a conduit containing stainless steel mesh or other porous material sandwiched between screen discs. The discs are attached to each other by means of a threaded bolt going through the center of each screen disc. Using the discs and threaded bolt, the steel mesh may be compressed or elongated to accommodate a variety of fluid flow ranges. It appears that the discs are slightly larger in diameter than the flow block hole, thus allowing the laminar flow discs to be fixed into position due to friction. This design has represented a hit or miss approach to achieving a particular flow rate versus pressure drop characteristic. That is, quite likely, an installer added or removed discs until the desired flow rate versus pressure drop characteristic had been achieved. This approach has been very labor intensive and caused unnecessary calibration time. Also, with this approach, it has been found that poor linearity resulted and the overall accuracy of a thermal mass flow sensor was significantly compromised.

SUMMARY OF THE INVENTION

Briefly, in accordance with the present invention, a precision laminar flow element is provided. The precision laminar flow element has a generally pointed entry end to maintain pure laminar flow around the laminar flow element. The generally pointed entry end serves to direct an incoming gas flow stream equally about an outer surface of the laminar flow element. In this way, the laminar flow path is uniform so as to maintain a desired flow accuracy.

The laminar flow element provides a plurality of standoff pins protruding from the outer surface of the laminar flow element to maintain a substantially equal radial clearance around the outer surface. By maintaining a substantially equal radial clearance from one laminar flow element to another, the laminar flow element is highly interchangeable.

The laminar flow element may also provide a plurality of slots formed in the laminar flow element to accept a relatively high incoming gas flow stream. The precision laminar flow element preserves a linear flow ratio for low and high flow rates.

The laminar flow element may be incorporated into a thermal mass flow sensor or flow controller such that the laminar flow element is substantially concentric with a borehole of a flow block. The laminar flow element thus can easily slide in and out of the borehole, simplifying cleaning and calibration of the precision laminar flow element. Removal and cleaning of the laminar flow element may be accomplished by persons unskilled in assembly and disassembly of thermal mass flow sensors and flow controllers. Further, calibration of the precision laminar flow element is unaffected by removal and reinstallation of the laminar flow element. Different laminar flow elements having different radial clearances may be inserted into the flow block thus providing a variety of calibrated flow ranges just by change-out of the laminar flow element.

BRIEF DESCRIPTION OF THE DRAWINGS

A better understanding of the present invention can be obtained from the following detailed description of the preferred embodiment as considered in conjunction with the following drawings, in which.

DETAILED DESCRIPTION OF PREFERRED EMBODIMENT

Figure 1:
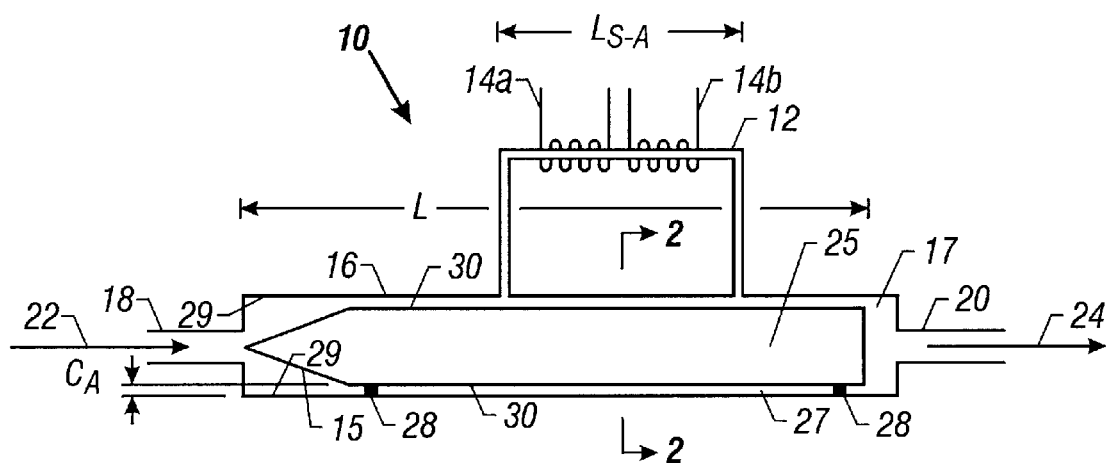
FIG. 1 is a side elevation view, taken partly in cross-section, of a thermal mass flow mechanism incorporating a low flow rate configuration of a precision laminar flow element in accordance with the present invention.

Turning now to the drawings, FIG. 1 shows a thermal mass flow mechanism 10 incorporating a low flow rate configuration of a precision laminar flow element 25 in accordance with the present invention. The thermal mass flow mechanism 10, which may be a thermal mass flow sensor or flow controller, for example, includes a sensing element 12 connected to a main flow block 16. The flow block 16 provides an inlet or entry end 18 for receiving an incoming gas flow stream 22 and an outlet or exit end 20 for providing an outgoing gas flow stream 24. The flow block 16 houses the precision laminar flow element 25. A portion of the incoming gas flow stream 22 passes through a main or laminar flow path defined by the precision laminar flow element 25 and the inner diameter of the flow block 16. Another portion of the incoming gas flow stream 22 passes through a sensing flow path defined by the sensing element 12.

In the disclosed embodiment, the sensing element 12 is a sensing tube. Two heated coils 14a and 14b are wound around the sensing tube 12 in close proximity to one another. The heated coils 14a and 14b direct a constant amount of heat into any portion of the incoming gas flow stream 22 flowing through the sensor tube 12. As a portion of the incoming gas flow stream 22 passes through the sensor tube 12, heat is carried from the upstream coil 14a to the downstream coil 14b. The heated coils 14a and 14b have a characteristic of resistance change with temperature change. The coils 14a and 14b thus experience a resistance difference due to passing of the incoming gas flow stream 22. The resistance difference is typically detected via conventional electronic circuitry utilized to produce an output signal proportional to the mass flow rate of the incoming gas flow stream 22.

The laminar flow element 25 is specially shaped and dimensioned, as described below, to achieve a high degree of precision. Most of the incoming gas flow stream 22 may pass around the laminar flow element 25 through the flow block 16 while a small portion of the incoming gas flow stream 22 flows through the sensing element 12. On the inlet end or nose 18 of the flow block 16, the laminar flow element 25 provides a pointed entry end 15 for maintaining pure laminar flow around the laminar flow element 25. The pointed entry end 15 insures that the incoming gas flow stream 22 passes equally around the outer perimeter of the laminar flow element 25. By establishing such a uniform laminar flow path, nearly ideal linear flow ratio (ratio of flow in the sensing element flow path and flow in the laminar flow path) from a predetermined maximum rated flow to approximately 1/200 of the predetermined maximum rated flow (i.e., 200:1 linear flow range capability) may be attained. Due to its configuration, the laminar flow element 25 lends itself to a low manufacturing cost.

The laminar flow element 25 further is provided with a plurality of outwardly extending standoff pins 28. The standoff pins 28 protrude from an outer surface 30 of the laminar flow element 25 to an inner surface 29 of the flow block 16 so as to maintain a substantially equal clearance CA around the outer surface 30. The standoff pins 28 aid in insuring the geometric stability of the laminar flow element 25.

In accordance with the present invention, the laminar flow element 25 may be substantially longer than the sensing element 12. In the disclosed exemplary embodiment, the laminar flow element 25 is about three times longer (i.e., substantially longer) than the sensing element 12. In this way, capillary flow through the laminar flow element path remains proportional to the pressure drop versus mass flow rate over a wide flow range. This wide flow range is wider than could be achieved if the length of the laminar flow element 25 was roughly the same as the length of the sensing element 12. In FIG. 1, the length of the sensing element 12 is designated by $L_{S-A}$.

In most commercially available mass flow meters, the laminar flow element has been the same length as the sensing tube. It has been found that small sensing tubes in the 0.02 to 0.03 internal diameter range require a pressure drop of about 0.6 to 1.0 inches of water to achieve maximum characteristics at maximum rated flow through the sensing tubes. If a gas stream having flow rates greater than 0.02 to 0.03 liters/minute are sent through the sensing tubes, then the electrical signal generated by the heated coils becomes non-linear. Thus, a conventional laminar flow element has been sized so that the pressure drop (upstream gauge pressure—downstream gauge pressure) across the laminar flow element is equal to the pressure drop across the sensing tube. However, if the laminar flow element 25 is three times longer than the sensing tube 12, then the laminar flow element 25 can bypass gas with approximately three times the flow rate of gas that may be bypassed by a laminar flow element which is only as long as a sensing tube element.

Another advantage of a longer laminar flow element 25, which Applicant has found by experimentation, is that an exceptionally linear relationship exists in the flow versus voltage output signal from the sensing coils 14a and 14b. Test data has shown errors of only +/−2% of reading for some common gases from rated full flow to 1/100 of rated flow.

Laminar flow elements that start at the beginning of a sensing tube inlet have not uniformly distributed the truly laminar flow effect at the sensing tube inlet and rarely have given purely linear output signals over more than a 25-to-1 range. So this added advantage of the longer laminar flow element 25 improves performance in the art of mass flow sensor design wherein bypass shunts are employed to achieve higher flow rates.

The laminar flow element configuration 25 preserves a linear flow ratio for low flow rates. For example, it has been found that such a configuration 25 is capable of linear flow rates from 10 to 50 liters/minute. Further, through testing of multiple embodiments of the present invention at flow ranges from 0–20 liters/minute, 0–50 liters/minute, 0–100 liters/minute, 0–200 liters/minute and 0–500 liters/minute, Applicant has found exceptionally linear voltage output response characteristics using air as a test gas.

Figure 2:
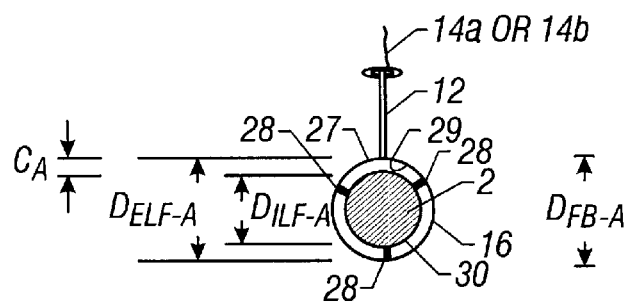
FIG. 2 is a cross-sectional view of the precision laminar flow element along lines A—A of FIG. 1.

Referring to FIG. 2, a cross-sectional view of the laminar flow element 25 along line A—A is shown. An annular leakage passage or path 27 (commonly termed a borehole) is formed in the flow block 16 between the outer surface 30 of the laminar flow element 25 (shown in shaded form) and the inner surface 29 of the flow block 16. In the disclosed exemplary embodiment, due to the standoff pins 28, the laminar flow element 25 is concentric with the borehole 27 within roughly 0.001 inches of a desired radial clearance over the entire outer perimeter of the laminar flow element 25. This insures a substantially equal radial clearance $C_A$ of the annular leakage passage 27 around the outer surface 30 of the laminar flow element 25. It has been determined by Applicant that radial clearances from approximately 0.010 to 0.045 inches preserve pure laminar flow over a differential pressure drop up to about 2 inches of water.

In accordance with the present invention, the annular leakage path 27 defined by the precision laminar flow element 25 and the flow block 16 creates laminar flow at relatively low pressure drops across the flow block 16. This especially occurs when the differential pressure across the flow block 16 is no greater than around 2 inches of water. At such low differential pressure across the laminar flow element 25, the gas laws approach (for all practical purposes) incompressible flow characteristics. Further, the laminar flow around the precision laminar flow element 25 inside the flow block 16 creates a very small gap around the periphery of the precision laminar flow element 25.

Figure 3:
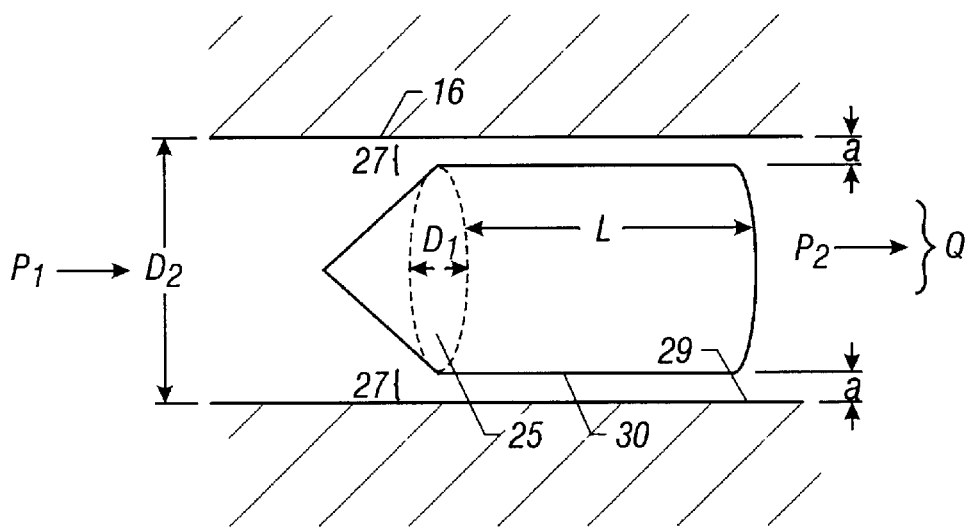
FIG. 3 is a schematic illustration of the precision laminar flow element of FIGS. 1 and 2 within a flow block in accordance with the present invention.

Referring to FIG. 3, a schematic illustration of the precision laminar flow element 25 within the flow block 16 is shown. This illustration is helpful in explaining how laminar flow through the precision laminar flow element 25 may be calculated. The equation for calculating laminar flow through the annular passage 27 around the precision laminar flow element 25 is below:

$$Q = \frac{\pi D a^3 \Delta p}{12 \mu L}$$

Q represents an annular leakage flow rate for the annular leakage path 27. D represents the average of the diameter $D_1$ of the laminar flow element 25 and the diameter $D_2$ of the flow block 16. In other words, $D=(D_1+D_2)/2$. The symbol 'a' represents the width of the annular leakage path 27. $\Delta p$ represents a difference between an upstream gauge pressure $p_1$ and a downstream gauge pressure $p_2$. $\Delta p$, thus, is equal to $p_1-p_2$. The symbol $\mu$ represents the absolute viscosity of the gas. L represents the length of the laminar flow path. The symbols $D_1$, $D_2$, L, Q, a, $p_1$ and $p_2$ are illustrated. The above laminar flow equation works very well in defining the annular leakage path 27 for laminar flow around the precision laminar flow element 25.

The above equation can be characterized as flow between infinite parallel plates for fully developed laminar flow. Experimentally, it has been determined by Applicant that laminar flow is fully developed when the length the laminar flow path L is greater than about 25 to 40 times the width 'a' of the annular leakage path 27 as long as the pressure drop across laminar flow element 25 does not exceed about 2 inches of water pressure drop. In the disclosed exemplary embodiment, the length L of the laminar flow path is maintained to much greater than about 40 times the annular leakage path 27. Also, in the disclosed exemplary embodiment, the Reynolds number (Re) of the precision laminar flow element 25 is maintained very low to insure laminar flow.

Figure 4:
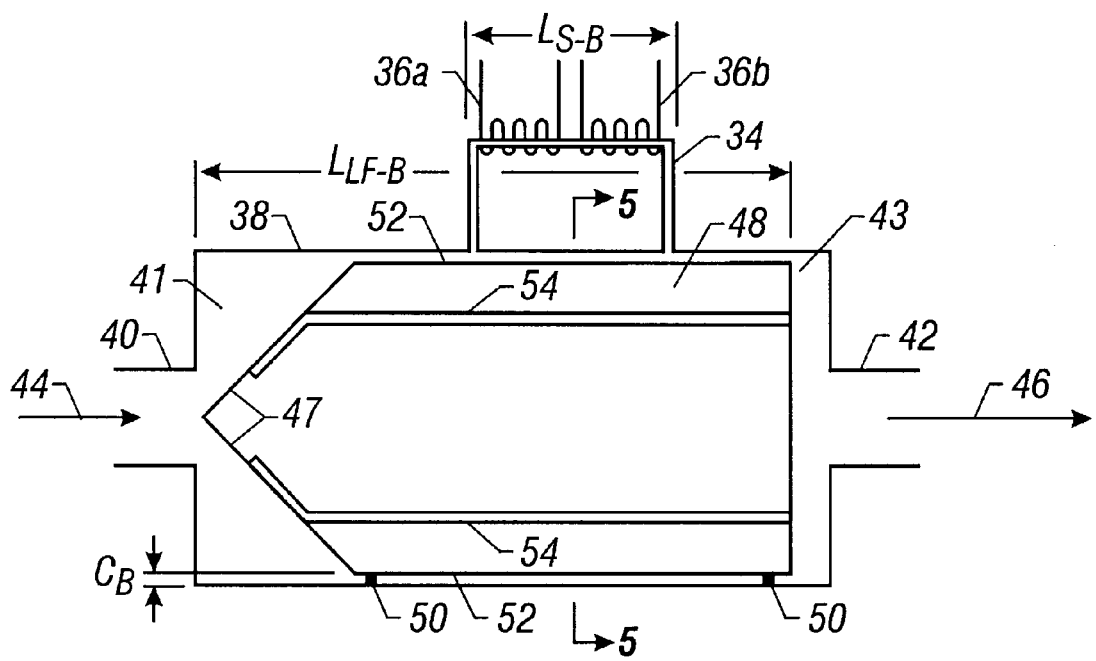
FIG. 4 is a side-elevation view, taken partly in cross-section, of a thermal mass flow mechanism incorporating a high flow rate configuration of a precision laminar flow element in accordance with the present invention.

As should be apparent from the laminar flow equation above, the geometry of the precision laminar flow element 25 permits use of ideal gas law equations to predict the flow versus differential pressure ratio. The geometry of the laminar flow element 25 may be described by the diameter of the precision laminar flow element $D_{ILF-A}$ (FIG. 2), the radial clearance $C_A$ between the precision laminar flow element 25 and the flow block 16 (FIGS. 1 and 2), and the length L of the precision laminar flow element 25 (FIGS. 1 and 4). The precision laminar flow element 25 provides a high degree of precision for each of these dimensions. The laminar flow element 25 provides a close correlation between these dimensions and the ideal gas law equations. The accuracy of the above laminar flow equation has been shown through its usage and experimental testing.

Returning to FIG. 2, in accordance with the present invention, the laminar flow element 25 may include a diameter $D_{ILF-A}$ of approximately 0.4356 inches and the annular leakage path 27 defined by the laminar flow element 25 is approximately 0.030 inches. For such a diameter of the element 25, the laminar flow element 25 may develop about 1.95 inches of water pressure drop at its predetermined maximum rated flow for linear performance at about 26 liters/min.

In the disclosed exemplary embodiment, three standoff pins 28 are placed near the pointed entry end 15 of the laminar flow element 25, and three standoff pins 28 are placed near the exit end 17 of the laminar flow element 25. The three standoff pins 28 at each end may be equally spaced (i.e., 120 degree spacing) as represented in FIG. 2.

The laminar flow element 25 may be machined with an external diameter $D_{ELF-A}$ slightly differing from an external diameter $D_{ELF-A}$ of another laminar flow element 25 to accommodate a different flow range. That is, a particular flow range obtained by the flow mechanism 10 is based on the external diameter dimension of the laminar flow element 25. In the disclosed embodiment, the external diameter $D_{ELF-A}$ of the laminar flow element 25 is preferably selected to provide a radial clearance in the 0.010 to 0.045 inch range. The diameter $D_{FB-A}$ of the flow block 16 is the sum of the external diameter $D_{ELF-A}$ of the laminar flow element 25 and twice the selected clearance. The capability of inserting various laminar flow elements 25 with different external diameters $D_{ELF-A}$ which provide different annular clearances allows for a versatile flow mechanism 10 for supporting a variety of flow rate ranges. A laminar flow element 25 may be interchanged in a matter of a few minutes.

In accordance with the present invention, an interchange of laminar flow elements 25 may be accomplished with minimal recalibration effort since the laminar flow element 25 can easily slide in and out of the borehole 27 in the flow block 16. Calibration of the laminar flow element 25 is unaffected by removal and reinstallation of the laminar flow element 25. Further, removal and cleaning of the laminar flow element 25 is a simple and uncomplicated task and may be accomplished by persons not having precision assembly/ disassembly skills. Typically in the past, technicians with considerable training in assembly and disassembly of mass flow sensors and flow controllers were required for such work on prior art laminar flow element structures.

Referring to FIG. 4, a sectional, side-elevational view of a thermal mass flow mechanism 32 incorporating a high flow rate configuration of a precision laminar flow element 48 is shown. The laminar flow rate configuration 48 is capable of linear flow rates from 100 to 500 liters/minute. The laminar flow element configuration 48 thus preserves a linear flow ratio at high flow rates.

The thermal mass flow mechanism 32 is of a similar construction and operates in a similar manner to the thermal mass flow mechanism 10 of FIG. 1. For example, the heated coils 36a and 36b and sensing tube 34 of FIG. 3 provide a like construction and operation to the heated coils 14a and 14b and the sensing tube 12 of FIG. 1. A plurality of standoff pins 50 and a pointed entry end or nose 41 of FIG. 3 provide a like construction and operation to the plurality of standoff pins 28 and the pointed entry end 15, respectively, of FIG. 1. The mass flow mechanism 32 receives a relatively high incoming gas flow stream 44 through an inlet end 40 of the flow block 38 and provides an outgoing gas flow stream 46 through an exit end 42 of the flow block 38. Also, the laminar flow element 48 is of a similar construction and operates in a similar manner to the laminar flow element 25 of FIG. 1.

An additional feature of the laminar flow element configuration 48 is a plurality of flow receiving or regulating slots 54 formed in the laminar flow element 48 to accept the relatively high incoming gas flow stream 44. For this particular view (FIG. 4), the plurality of slots 54 extend from the pointed inlet end 41 of the laminar flow element 48 to the outlet end 43 of the laminar flow element 48 in a longitudinal path parallel to the gas flow. The slots 54 further extend outwardly along a tapered portion of an inner surface 47 of the pointed inlet end 41 in a diagonal manner. In the disclosed embodiment, four 0.031 inch-wide slots 54 are cut into the laminar flow element 48 at about 90 degree intervals as seen in FIG. 4. The slots 54 allow the relatively high incoming gas flow stream 44 to pass through the flow block 38 and preserve pure laminar flow. Depending upon the desired flow rate, the number of slots 54 cut or formed into the laminar flow element 48 may vary from 0 to 24 slots.

Figure 5:
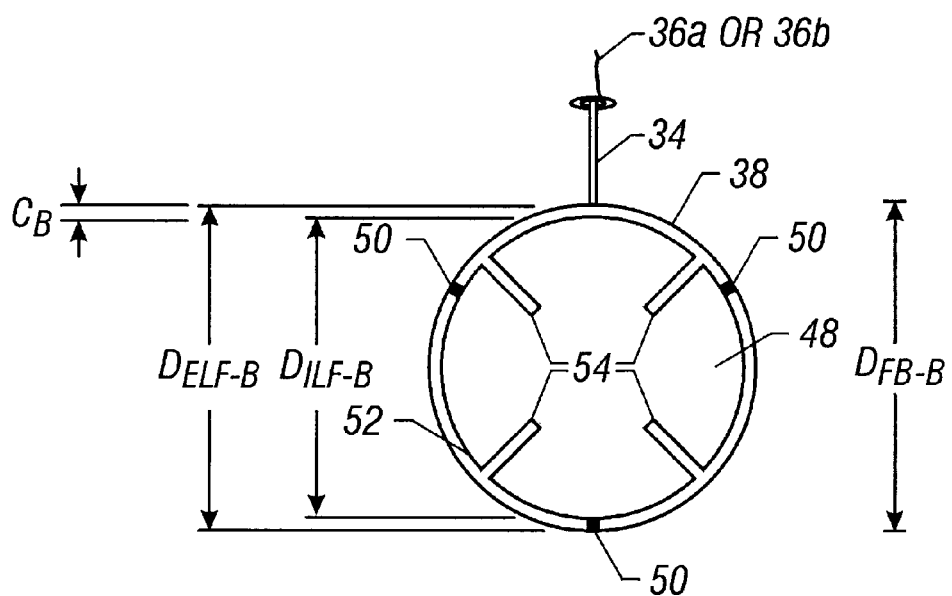
FIG. 5 is a cross-sectional view of the precision laminar flow element along lines B—B of FIG. 3.

Referring to FIG. 5, a cross-sectional view of the laminar flow element 48 along line B is shown. The radial clearance ($C_B$) and diameter dimensions (laminar flow element diameter $D_{ILF-B}$, external laminar flow element diameter $D_{ELF-B}$, and flow block diameter $D_{FB-B}$) illustrated serve a like purpose as those described in connection with FIG. 2.

The foregoing disclosure and description of the preferred embodiment are illustrative and explanatory thereof, and various changes in the details of the illustrated apparatus and construction and method of operation may be made without departing from the spirit of the invention.

We claim:

1. A thermal mass flow measurement mechanism, comprising:
    a sensing element for obtaining a measurement indicative of mass flow rate; and
    a flow block connected to the sensing element, comprising:
        the flow block having a borehole receiving a flow of the fluid where mass flow rate is to be measured; and
        a laminar flow element within the borehole of the flow block and having a pointed entry end to direct flow around the laminar flow element and to cause a laminar flow path in the borehole around the laminar flow element.

2. The mechanism of claim 1, wherein the pointed entry end directs an incoming gas flow stream equally about an outer surface of the laminar flow element.

3. The mechanism of claim 1, the laminar flow element, further comprising:
    a plurality of standoff pins protruding from an outer surface of the laminar flow element to maintain a substantially equal radial clearance around the outer surface.

4. The mechanism of claim 1, wherein the laminar flow element is substantially concentric with the borehole of the flow block.

5. The mechanism of claim 1, wherein the laminar flow element comprises an outer surface of a preselected diameter to provide a predetermined substantially equal radial clearance with the borehole of the flow block.

6. The mechanism of claim 1, the laminar flow element, comprising:
    a plurality of slots formed into the laminar flow element to accept a relatively high incoming gas flow stream and preserve laminar flow.

7. The mechanism of clam 1, wherein the laminar flow element comprises a cylindrical exit end.

8. The mechanism of claim 1, wherein the laminar flow element is substantially longer than the sensing element.

9. A thermal mass flow measurement mechanism, comprising:
    a sensing element for obtaining a measurement indicative of mass flow rate; and
    a flow block connected to the sensing tube, comprising:
        the flow block having a borehole receiving a flow of the fluid where mass flow rate is to be measured; and
        a laminar flow element within the borehole of the flow block and having a pointed entry means for directing flow around the laminar flow element and for causing a laminar flow path in the borehole around the laminar flow element.

10. The mechanism of claim 9, wherein the pointed entry means directs an incoming gas flow stream equally about an outer surface of the laminar flow element.

11. The mechanism of claim 9, the laminar flow element further comprising:
    a protruding means for defining a predetermined substantially equal radial clearance between the laminar flow element and the flow block so that the laminar flow element is substantially concentric with the borehole of the flow block.

12. The mechanism of claim 9, the laminar flow element further comprising:
    a plurality of slot means formed into the laminar flow element to accept a relatively high incoming gas flow stream and preserve laminar flow.

13. The mechanism of claim 9, wherein the laminar flow element comprises a cylindrical exit end.

14. The mechanism of claim 9, wherein the laminar flow element is substantially longer than the sensing element.

15. A laminar flow element for use in a thermal mass flow measurement mechanism, comprising:
    a laminar flow element for placement within a borehole of a flow block of the thermal mass flow measurement mechanism and having a pointed entry end to cause a laminar flow path around the laminar flow element.

16. The laminar flow element of claim 15, wherein the pointed entry end directs an incoming gas flow stream equally about an outer surface of the laminar flow element.

17. The laminar flow element of claim 15, further comprising:
    a plurality of standoff pins protruding from an outer surface of the laminar flow element to maintain a substantially equal radial clearance around the outer surface.

18. The laminar flow element of claim 15, further comprising:
    a plurality of slots formed into the laminar flow element to accept a relatively high incoming gas flow stream and preserve laminar flow.

19. The laminar flow element of claim 15, wherein the laminar flow element comprises a cylindrical exit end.

20. The laminar flow element of claim 15, wherein the laminar flow element provides a 200:1 linear flow range capability.

* * * * *